United States Patent [19]
Hiestand et al.

[11] 3,722,497
[45] Mar. 27, 1973

[54] WALL SAW

[75] Inventors: James C. Hiestand, Redondo Beach; Richard O. Thies, both of Lane, Studio City, Calif.

[73] Assignee: Continental Drilling Company, Los Angeles, Calif.

[22] Filed: Apr. 8, 1971

[21] Appl. No.: 132,387

[52] U.S. Cl. .................................................. 125/14
[51] Int. Cl. ............................................... B28d 1/04
[58] Field of Search ...................... 125/12–14; 143/46

[56] References Cited

UNITED STATES PATENTS

| 2,996,088 | 8/1961 | Hensley | 143/46 R |
| 1,491,287 | 4/1924 | Canning | 125/13 R |
| 3,378,307 | 4/1968 | Dempsey | 125/14 X |
| 2,496,716 | 2/1950 | Hanna | 143/46 R X |
| 3,323,507 | 6/1967 | Schuman | 125/14 |

FOREIGN PATENTS OR APPLICATIONS

| 839,470 | 5/1952 | Germany | 125/14 |

*Primary Examiner*—Harold D. Whitehead
*Attorney*—Nilsson, Robbins, Willis & Berliner

[57] ABSTRACT

A saw for cutting openings in walls and other flat surfaces is disclosed. The saw is mounted on a trolley which rides on a track attached to the flat surface, and is moved along the track by means of a gear driving device. The saw blade is mounted at one end of an arm. The arm is pivotable about its other end, which is attached to a cylindrical housing around the output shaft of the motor. When the housing is rotated, the end of the arm holding the saw blade is moved up and down for adjusting the depth of cut.

9 Claims, 4 Drawing Figures

INVENTORS.
JAMES C. HIESTAND
RICHARD O. THIES
BY
NILSSON, ROBBINS, WILLS & BERLINER
ATTORNEYS.

PATENTED MAR 27 1973

INVENTORS.
JAMES C. HIESTAND
RICHARD O. THIES
BY
NILSSON, ROBBINS, WILLS & BERLINER
ATTORNEYS.

WALL SAW

BACKGROUND OF THE INVENTION

1. Field of the Invention

This invention relates to the field of saws, and particularly relates to saws adapted to follow a fixed guide and cut a flat surface such as a wall.

2. Description of the Prior Art

It is often desirable to remodel certain buildings which house activities which are subject to continuous updating, such as a hospital or office building. When such remodeling takes place, a convenient means of opening new passages through walls is required. In such work, the primary requirement is a saw which is capable of making a very accurate, straight cut. It is also desirable to have a saw which is capable of cutting very hard surfaces, such as concrete.

There are certain devices in the prior art which satisfy the above objectives. However, the present invention operates to satisfy those objectives in a different manner, and as such has certain basic advantages.

In certain prior devices, problems were encountered if the length of cut desired was longer than the particular track for the device. Either the track was flat, and multiple pieces of track had to be interlocked together to achieve the desired length, or the track was raised and the follower surrounded the track, in which case it was not possible to join multiple sections of track.

In the present invention, however, the track is raised, but the follower or trolley does not completely encircle the track. Rather, it rides on wheels disposed on all sides of the track. However, the wheels riding on the bottom edge of the track do not span the entire track, and there is room for mounting brackets for the track which do not interfere with the travel of the trolley. Hence, multiple sections of track may be mounted end to end, and the support of each section will not interfere with the movement of the trolley.

In previous devices, the proper depth of cut is obtained by mechanism which moved the entire saw assembly up and down. In most devices, the saw assembly was slidably mounted on pillars, and a screw was used to slide the assembly up and down on the pillars. In the present invention, the motor and output shaft are not moved to obtain the proper depth of cut. Rather, the cutting blade is mounted on the end of an arm and the arm pivots to move the blade up and down.

In previous devices, almost the entire weight of the device was moved up and down, and hence was not solidly mounted to the rail. Since a large part of the vibration is caused by the motor, a nonrigid mounting causes the entire mechanism to vibrate. This will result in excessive saw blade wear. Another effect of such construction is that the vibration will cause noise, which is undesirable, especially if the device is used in a hospital or office building.

In the present device, the motor and drive shaft are mounted directly to the trolley and then to the rail. The only part which moves to change the depth of cut is the arm and the saw blade itself. Hence, most of the weight of the device and vibration causing mechanisms are solidly mounted. This will result in a very accurate cut, and will minimize saw blade wear and noise from the device.

SUMMARY OF THE INVENTION

The saw assembly is driven by a motor having a rotatable output shaft. An outer housing is located about the output shaft of the motor. A cylindrical housing is disposed around the output shaft within the outer housing such that the longitudinal axis of the cylindrical housing is substantially coincident with the longitudinal axis of the output shaft. The cylindrical housing is connected to the outer housing such that the cylindrical housing can be selectably rotated about its longitudinal axis.

An arm is attached at one end to the cylindrical housing such that when the cylindrical housing is rotated, the arm will be rotated also. A saw blade is attached to the other end of the arm, and means are provided connecting the saw blade to the output shaft so that the motor drives the saw blade.

In specific embodiments of the invention, the outer housing is attached to a trolley. The trolley rides along a track which is mounted to the surface to be cut by means of brackets attached to the surface.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENTS

Figure 1:
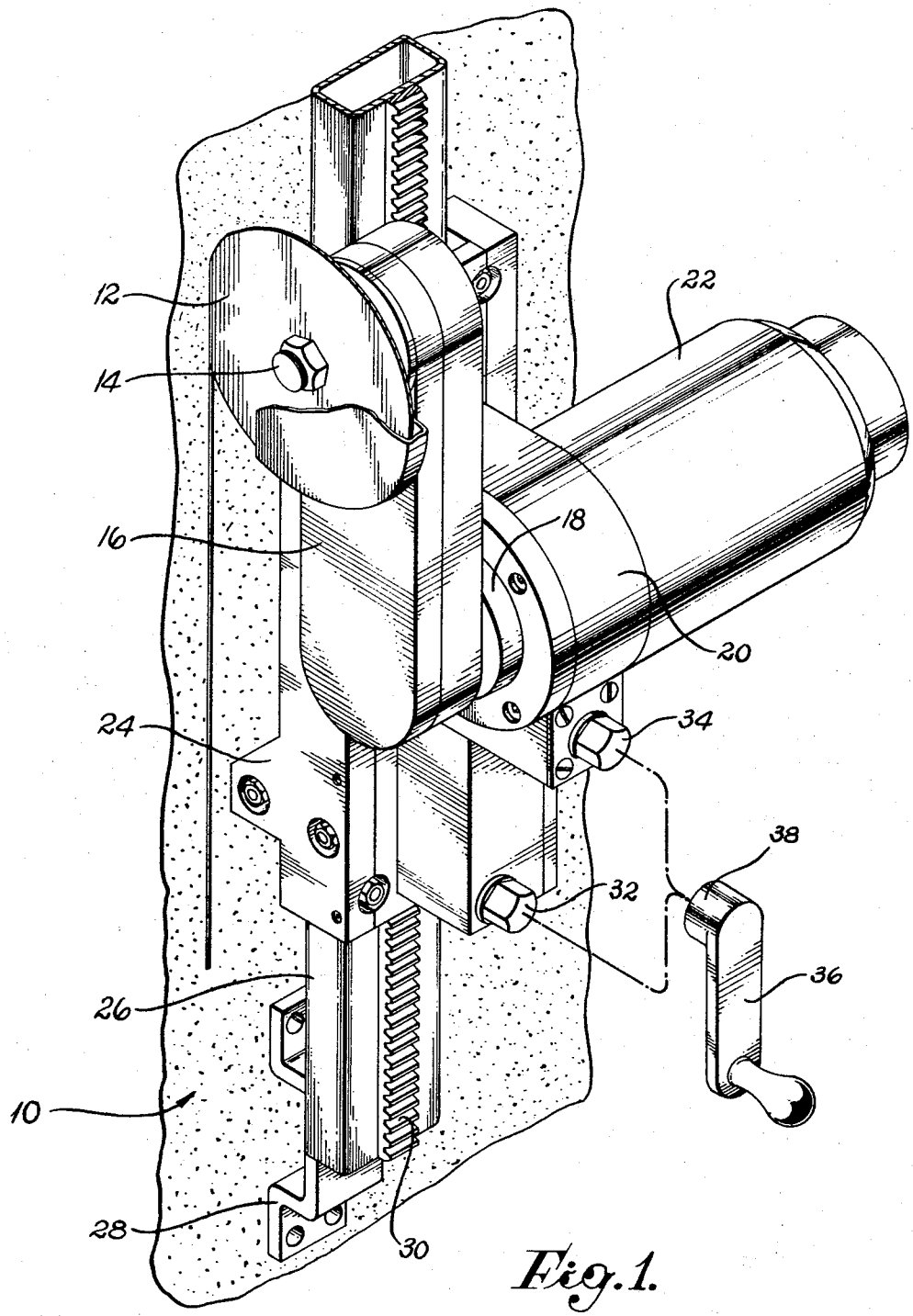
FIG. 1 is a perspective view of the wall saw.

Referring to FIG. 1, the operation of the saw assembly in cutting a flat surface 10 is demonstrated. The saw blade is attached to a spindle 14 at the end of the arm 16. The arm 16 is attached at one end to a circular housing 18 which is surrounded by an outer housing 20. A motor 22 is attached at the side of the outer housing 20. The outer housing 20 is attached to a movable trolley 24 which rides on a tubular track 26. The tubular track 26 is mounted to the flat surface 10 by means of brackets 28 and 28' (not visible).

The tubular track 26 has rack teeth 30 disposed along its length. The head 32 of the drive shaft and the head 34 of the adjustment shaft are indicated. The head 32 of the drive shaft and the head 34 of the adjustment shaft are shaped in the form of a polygon. A handle 36 having one end 38 adapted to mate with both the head 32 of the drive shaft and the head 34 of the adjustment shaft is provided to turn the shafts.

Figure 2:
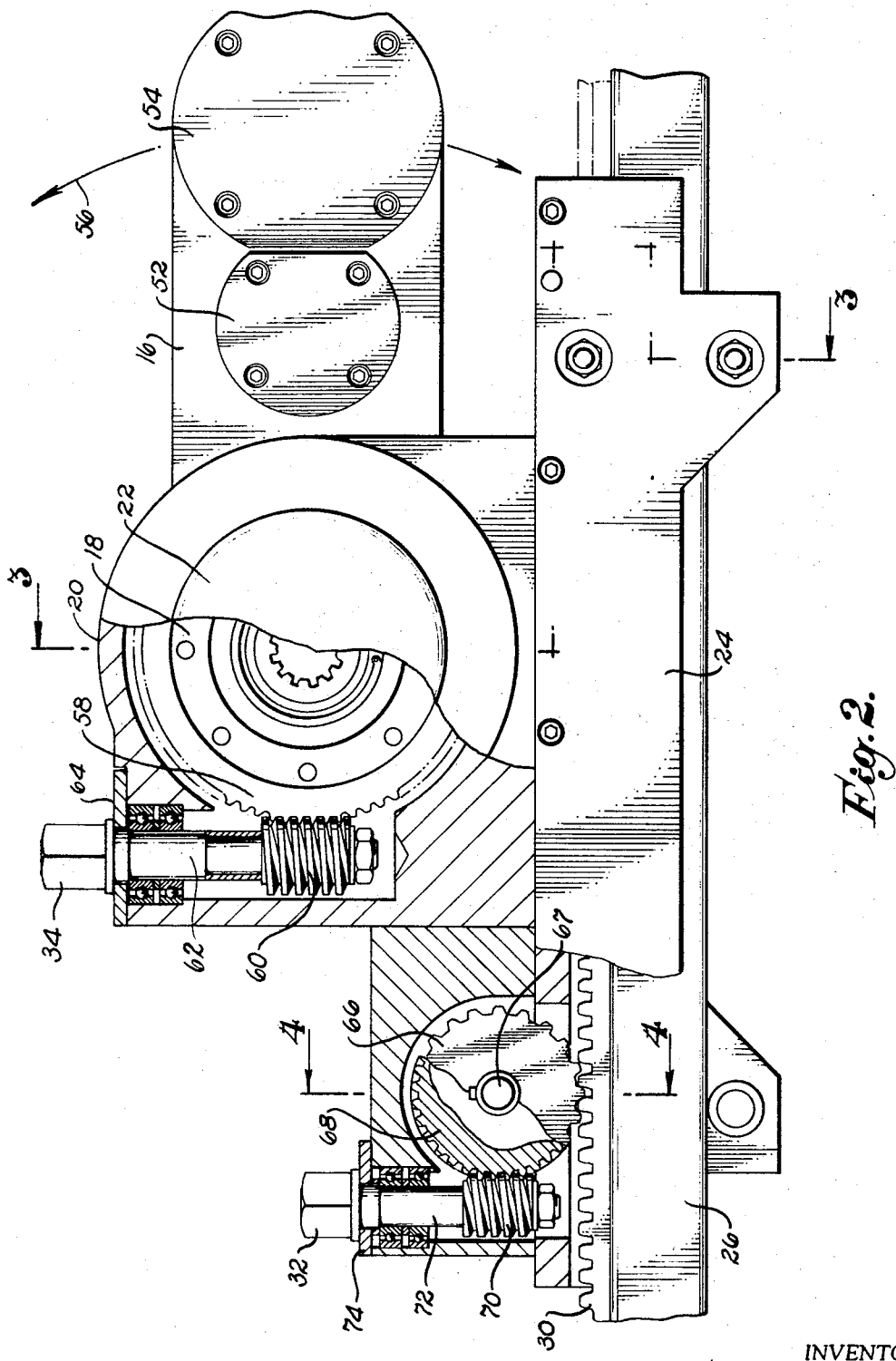
FIG. 2 is a side view of the wall saw taken from the side opposite the arm, showing the worm drive and adjustment in detail.

Referring to FIG. 2, certain internal details of the saw assembly illustrated in FIG. 1 are evident. The trolley 24 is shown mounted on the tubular track 26, and the outer housing 20 is attached to the trolley. The motor 22 is shown attached to the outer housing 20, and the arm 16 having bearing retainer plates 50 and 52 is partially visible. Possible rotational movement of the arm 16 is indicated by the arrow 56.

The outer housing 20 is partially cut away in FIG. 2 to illustrate the details of the adjustment mechanism. An adjustment worm wheel 58 is attached to the circular housing 18. An adjustment worm 60 mates with the adjustment worm wheel 58, and has a shaft 62 which culminates in the polygon shaped head 34. The proper position of the adjustment shaft 62 is maintained by engagement of the worm 60 with the worm gear 58.

The operation of the drive mechanism is also illustrated The drive worm 70 is attached to FIG. 2. A circular gear 66 which is rotatably attached to the trolley 24 by a shaft 67 mates with the rack teeth 30. A drive worm wheel 68 is attached to the circular gear 66 (which is shown partially cut away) so that rotation of the drive worm causes the circular gear to rotate. A drive worm 70 is adapted to mesh with the drive worm wheel 68. to a drive shaft 72 which culminates in a polygon shaped head 32. Position of the drive shaft 72 is maintained by engagement of the worm 70 with the worm gear 68.

Figure 3:
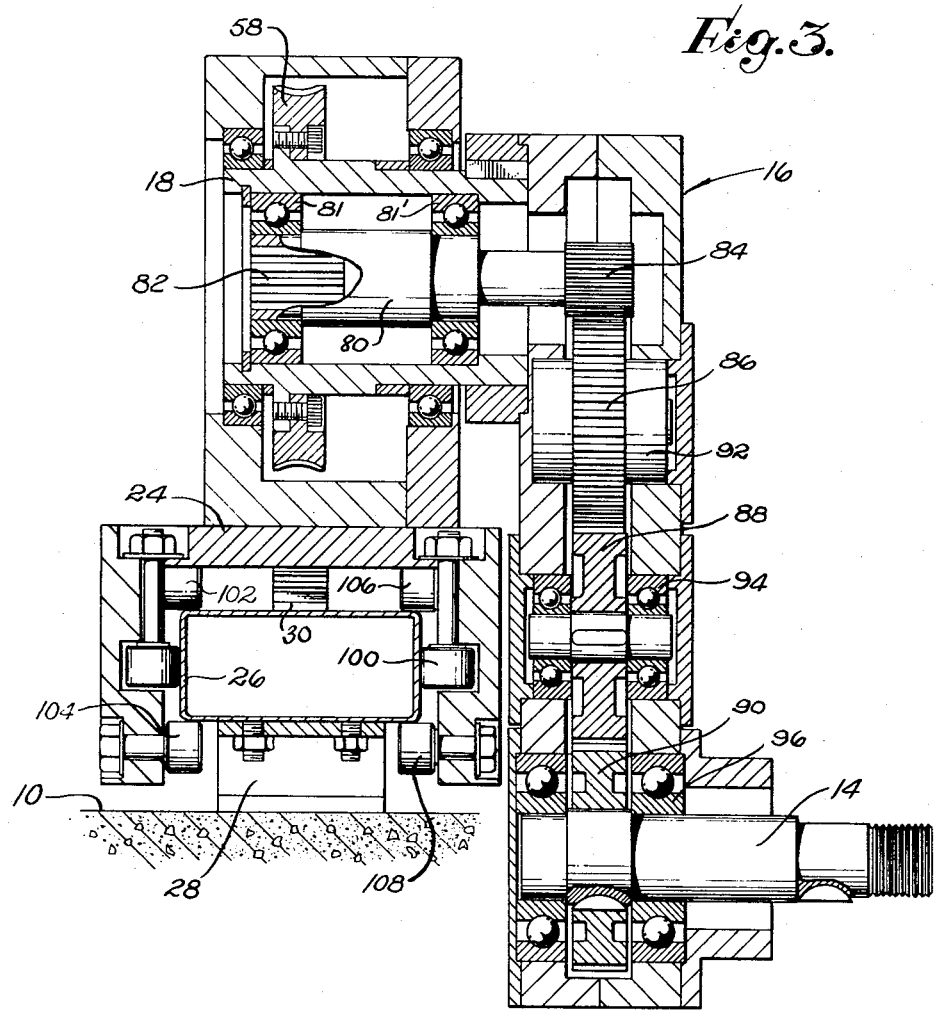
FIG. 3 is a top cross-section view of the wall saw.

Referring to FIG. 3, the details of the arm and circular housing 18 are illustrated. An adjustment worm wheel 58 is disposed around the circular housing 18 and rigidly attached to the circular housing. The output shaft 80 of the motor is located along the centerline of the circular housing 18 and connected by ball bearings 81 and 81'. The output shaft 80 may have an internal spline 82 for attachment to the motor. The end of the output shaft 80 opposite the attachment to the motor is formed as a pinion gear 84.

A series of connected circular gears 86, 88 and 90 are located within the arm 16. The gears are mounted on ball bearings 92, 94 and 96 which are attached to the arm 16. The series of connected circular gears forms a gear train which meshes with the pinion gear 84 at one end and is attached to the spindle 14 at the other. In this manner, the rotation of the motor is transferred through the output shaft 80 through the gear train to the spindle 14 to rotate the saw. The circular gears 86, 88 and 90 and the pinion gear 84 can be varied in circumference to provide the proper rotation speed to the saw blade.

Details of the attachment of the trolley 24 to the tubular track 26 are illustrated in FIG. 3. This figure is a cross-section view taken in the plane of the side wheel 100 on the right side and the left upper and lower wheels 102 and 104 on the left side. The right upper and lower wheels 106 and 108 are also visible. It is apparent from the figure that wheels abut the tubular track 26 on all four sides. Six wheels are used both on the front and rear of the trolley 24 to firmly support the trolley 24 on the track 26.

A bracket 28 by which the track is mounted to the flat surface 10 is also shown in FIG. 3. The bracket 28 is narrower than the width of the track 26 so that the lower side wheels 104 and 108 pass outside of the bracket. In this manner, the method of securing the track 26 to the flat surface 10 does not interfere with the movement of the trolley 24 along the track.

Figure 4:
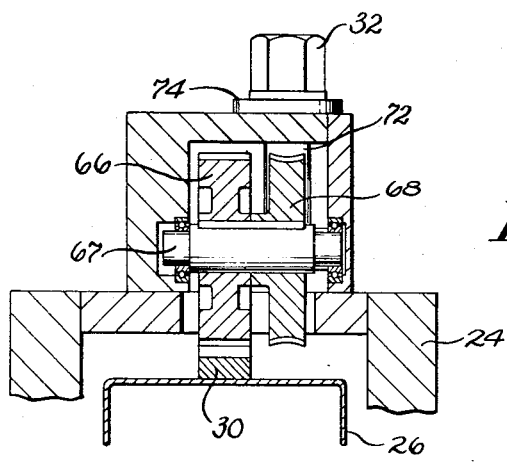
FIG. 4 is a cross-section of the worm drive taken along line 4—4 of FIG. 2.

Referring to FIG. 4, the details of the worm drive assembly are illustrated. The trolley 24 is shown mounted on the track 26 which has rack teeth 30. The circular gear 66 meshes with the rack teeth 30 and is mounted on the shaft 67. A drive worm wheel 68 is also mounted on the shaft 67, and is driven by the drive shaft 72 having a polygon shaped head 32.

The operation of the wall saw can be demonstrated with reference to the above illustrations. The tubular track 26 is mounted to the substantially flat surface 10 by means of brackets 28 and 28'. Since holes are to be bored into the flat surface 10, it is preferrable to locate the saw in the portion of the wall to be removed. Although the invention is specifically adapted to cutting walls, it can be readily used on other flat surfaces as well, and can be used to cut concrete or other types of materials. If a cut longer than a given track section is required, several track sections may be joined end to end to achieve the desired length.

A trolley 24 is mounted on the track 26. Since the trolley completely surrounds the track 26, it must be slipped on the end of the track. This operation is easily accomplished since the width of the brackets is more narrow than the spacing of the wheels 104 and 108 on the bottom of the trolley 24. For the same reason, several track sections may be joined to form a continuous track without interfering with the travel of the trolley 24.

The trolley 24 is moved along the track and prevented from sliding randomly along the track by means of the drive assembly illustrated in FIGS. 2 and 5. A handle 36 has an end 38 which mates with the head 32 of the drive shaft 72. When the handle 36 is turned, a worm 70 is activated which rotates a drive worm wheel 68, which in turn rotates a circular gear 66. The circular gear 66 meshed with the rack teeth 30 disposed along the track 26 and the rotation of the circular gear propels the trolley 24 along the track. If the handle 36 is not rotated, the position of the trolley 24 on the track 26 is maintained by the frictional contact of the drive shaft 72 with the annular piece 74, and the position of the trolley is locked to prevent sliding induced by gravity.

An electric or air motor may be used to activate the worm if power drive thereof is desired. A circular saw blade 12 is attached to a spindle 14 at the end of the arm 16. The arm is pivotable about the longitudinal axis of the output shaft 80 as illustrated in FIG. 4. Such pivoting of the arm 16 raises and lowers the saw blade 12, and controls the depth of cut. The arm is pivoted by rotation of the circular housing 18 to which it is rigidly attached.

Rotation and positioning of the circular housing 18 is controlled by an adjustment assembly illustrated in FIG. 2. The handle 36 mates to the head 34 of the adjustment shaft 62, and is used to rotate the adjustment worm 60. The adjustment worm 60 meshed with an adjustment worm wheel 58 rigidly attached around the circular housing 18. When the handle 36 is turned, the adjustment assembly causes the circular housing 18 to rotate, which in turn adjusts the position of the saw blade 12 and the proper depth of cut. If the handle is not turned, the position of the saw blade 12 is maintained by frictional contact of the adjustment shaft 62 with the annular piece 64.

What is claimed is:

1. A saw assembly comprising:
   a motor having a rotatable shaft,
   an outer housing about the output shaft of the motor,
   A MOVABLE TROLLEY TO WHICH THE OUTER HOUSING IS ATTACHED:
   a track having a longitudinal axis along which the trolley moves and brackets by which the track is mounted to a surface,
   a cylindrical housing disposed around the output shaft within the outer housing such that the longitudinal axis of the cylindrical housing is substantially coincident with the longitudinal axis of the output shaft.
   means connecting the cylindrical housing to the outer housing such that the cylindrical housing is selectably rotatable about its longitudinal axis,
   means for adjusting the position of a saw blade and its depth of cut in a plane parallel to the axis of said track, said saw blade being adjustably positioned so as to cut said surface along said track on either side of said intersection of the plane of the longitudinal axis of said cylindrical housing and said track axis comprising an arm having a first end rigidly attached to the cylindrical housing and rotatable therewith,
   said saw blade being attached to the arm, at a second end opposite the first end of said arm, and
   drive means connecting the saw blade to the output shaft whereby the motor drives the saw blade.

2. A device as recited in claim 1 wherein the end of the output shaft opposite the motor is formed as a pinion gear and wherein the drive means comprises:
   a spindle rigidly attached to the saw blade and rotatably attached to the second end of the arm, and
   multiple circular gears disposed along the length of the arm and connected in a continuous series to form a drive train, said drive train connected to the pinion gear at one end and to the spindle at the other end such that rotation of the pinion gear causes rotation of the spindle.

3. A device as recited in claim 1 wherein the track is tubular and comprises a series of track sections positioned end to end to form a substantially continuous track.

4. A device as recited in claim 3 and additionally comprising wheels connected to the trolley and adapted to rest on the track and facilitate travel of the trolley along the track.

5. A device as recited in claim 4 wherein the tubular track has a substantially rectangular cross-section and wherein the wheels are adapted to rest on all four sides of the tubular track.

6. A device as recited in claim 3 and additionally comprising rack teeth disposed along the length of the tubular track and gear driving means connecting the rack teeth with the trolley by which the trolley is propelled along the track.

7. A device as recited in claim 6 wherein the gear driving means comprises:
   a circular gear rotatably attached to the trolley and adapted to mesh with the rack teeth,
   a drive worm wheel rigidly attached to the circular gear and rotatable therewith,
   a drive worm adapted to mesh with the drive worm wheel, and
   means for driving the drive worm.

8. A device as recited in claim 7 wherein the means for driving the drive worm comprises:
   a rotatable drive shaft rigidly attached to the drive worm and rotatable therewith, said drive shaft having a head formed in the shape of a polygon,
   a handle having one end adapted to mate with the head of the drive shaft in abutting relationship to the polygon sides such that rotation of said handle causes rotation of said drive shaft,
   and wherein the means connecting the cylindrical housing to the outer housing comprises:
   an adjustment worm wheel disposed around the cylindrical housing and adapted to rotate about the longitudinal axis of said cylindrical housing, said adjustment worm wheel fixed to said cylindrical housing and rotatable therewith,
   an adjustment worm adapted to mesh with the adjustment worm wheel, and
   a rotatable adjustment shaft rigidly attached to the adjustment worm and rotatable therewith, said adjustment shaft having a head formed in the shape of polygon similar to the head of the drive shaft such that the handle mates with the head of the adjustment shaft in abutting relationship to the polygon sides.

9. A device as recited in claim 1 wherein the means connecting the cylindrical housing to the outer housing comprises:
   an adjustment worm wheel disposed around the cylindrical housing and adapted to rotate about the longitudinal axis of the cylindrical housing, said adjustment worm wheel fixed to said cylindrical housing and rotatable therewith,
   an adjustment worm adapted to mesh with the adjustment worm wheel, and
   means for rotating the adjustment worm.

* * * * *

UNITED STATES PATENT OFFICE
CERTIFICATE OF CORRECTION

Patent No. 3,722,497          Dated March 27, 1973

Inventor(s) JAMES C. HEISTAND, ET. AL.

It is certified that error appears in the above-identified patent and that said Letters Patent are hereby corrected as shown below:

Column 3, lines 15-27 should read as follows:

-- The operation of the drive mechanism is also illustrated in Figure 2. A circular gear 66 which is rotatably attached to the trolley 24 by a shaft 67 mates with the rack teeth 30. A drive worm wheel 68 is attached to the circular gear 66 (which is shown partially cut away) so that the rotation of the drive worm causes the circular gear to rotate. A drive worm 70 is adapted to mesh with the drive worm wheel 68. The drive worm 70 is attached to a drive shaft 72 which culminates in a polygon shaped head 32. Position of the drive shaft 72 is maintained by engagement of the worm 70 with the worm gear 68. -- . Column 5, lines 4-5, "A MOVABLE TROLLEY TO WHICH THE OUTER HOUSING IS ATTACHED:" should read -- a movable trolley to which the outer housing is attached; -- .

Signed and sealed this 20th day of November 1973.

(SEAL)
Attest:

EDWARD M. FLETCHER, JR.          RENE D. TEGTMEYER
Attesting Officer                Acting Commissioner of Patents